(12) United States Patent
Wu

(10) Patent No.: US 9,921,444 B2
(45) Date of Patent: Mar. 20, 2018

(54) LIQUID CRYSTAL PANEL

(71) Applicant: Shenzhen China Star Optoelectronics Technology Co., Ltd., Shenzhen (CN)

(72) Inventor: Chuan Wu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 288 days.

(21) Appl. No.: 14/779,005

(22) PCT Filed: Aug. 24, 2015

(86) PCT No.: PCT/CN2015/087964
§ 371 (c)(1),
(2) Date: Sep. 21, 2015

(87) PCT Pub. No.: WO2017/028325
PCT Pub. Date: Feb. 23, 2017

(65) Prior Publication Data
US 2017/0255068 A1 Sep. 7, 2017

(30) Foreign Application Priority Data
Aug. 18, 2015 (CN) .......................... 2015 1 0509011

(51) Int. Cl.
*G02F 1/1362* (2006.01)
*G02F 1/1333* (2006.01)
(Continued)

(52) U.S. Cl.
CPC ...... *G02F 1/136209* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS 8,400,599 B2 * 3/2013 Chang ............... G02F 1/136209
349/111
2004/0125286 A1 * 7/2004 Moon ............... G02F 1/136209
349/113
(Continued)

FOREIGN PATENT DOCUMENTS

| CN | 1932624 A | | 3/2007 |
|---|---|---|---|
| CN | 101369076 | * | 2/2009 |
| CN | 101369076 A | | 2/2009 |

*Primary Examiner* — Ryan Crockett
(74) *Attorney, Agent, or Firm* — Leong C. Lei

(57) ABSTRACT

The present invention provides a liquid crystal panel, in which a black matrix is formed on a TFT substrate and the black matrix includes a plurality of black light shielding frames respectively located in a plurality of pixel zones and arranged in the form of a matrix. The black light shielding frames are each set at a gap between a light blocking frame and data lines and scan lines along a periphery of an opening area of each of the pixel zones so that the liquid crystal panel of the present invention eliminates the occurrence of defect situations of light leaking and color shifting resulting from positional deviation of the black matrix caused by positional shift between upper and lower substrates and also provides a relatively high aperture ratio.

15 Claims, 5 Drawing Sheets

(51) Int. Cl.
*G02F 1/1335* (2006.01)
*G02F 1/1343* (2006.01)
*G02F 1/1368* (2006.01)

(52) U.S. Cl.
CPC .. *G02F 1/133345* (2013.01); *G02F 1/133514* (2013.01); *G02F 1/134309* (2013.01); *G02F 1/136286* (2013.01); *G02F 2001/133302* (2013.01); *G02F 2201/121* (2013.01); *G02F 2201/123* (2013.01); *G02F 2201/40* (2013.01)

(56) References Cited

U.S. PATENT DOCUMENTS

2006/0209222 A1\* 9/2006 Yasuda ............. G02F 1/136209
    349/43
2007/0040951 A1\* 2/2007 Lee .................. G02F 1/136213
    349/38
2011/0241006 A1\* 10/2011 Mitani ............. G02F 1/136209
    257/59
2016/0342046 A1\* 11/2016 Wu ..................... G02F 1/13394

\* cited by examiner

LIQUID CRYSTAL PANEL

BACKGROUND OF THE INVENTION

1. Field of the Invention

The present invention relates to the field of display technology, and in particular to a liquid crystal panel.

2. The Related Arts

A liquid crystal display (LCD) has a variety of advantages, including thin device body, power saving, and being free of radiation, and is thus widely used in for example mobile phones, personal digital assistants (PDAs), digital cameras, computer screens, and displays of notebook computers. Most of the liquid crystal displays that are currently available in the market are backlighting liquid crystal displays, which comprise a backlight module and a liquid crystal panel combined with the backlight module.

A thin-film transistor liquid crystal display (TFT-LCD) generally comprises a black matrix (BM) formed on a substrate to separate adjacent color resists, shield gaps between colors, and prevent leaking of light or mixing of colors. However, when a relatively large positional shift occurs between upper and lower substrates, positional deviation of the color resists would lead to deviation of a light shielding area of the black matrix, causing problems of color mixing and color shifting and light leaking. Such a situation is even more severe in manufacturing a curved television, because the positional shift between the upper and lower substrates of a panel would be greater for a curved surface. Thus, a general solution is to increase the width of the black matrix to make an actual width of the black matrix greater than the distance between two adjacent light-shielding frames so as to prevent the problems of color mixing and color shifting and light leaking resulting from the positional shift between the upper and lower substrates.

Referring to FIGS. 1-3, schematic views are provided to illustrate the structure of a conventional liquid crystal panel, which comprises a thin-film transistor (TFT) substrate 100, a color filter (CF) substrate 200 opposite to the TFT substrate 100, and a liquid crystal layer 300 arranged between the TFT substrate 100 and the CF substrate 200.

The TFT substrate 100 comprises a first substrate 101, a plurality of scan lines 800 that is arranged to extend in a horizontal direction, a plurality of data lines 700 that is arranged to extend in a vertical direction, a plurality of light blocking frames 110, a plurality of TFTs 900, and a pixel electrode 120.

The CF substrate 200 comprises a second substrate 201, a black matrix 210 arranged on a lower surface of the CF substrate 200, color resist layers 220 arranged under the second substrate 201 and separated by the black matrix 210, and a common electrode 230 arranged under the color resist layers 220.

In the TFT substrate 100, the plurality of scan lines 800 and the plurality of data lines 700 perpendicularly intersect each other to define a plurality of pixel zones 500. Each of the pixel zones 500 comprises, formed therein, an opening area 400. The light blocking frames 110 are arranged under the pixel electrode 120 and corresponding to outer peripheries of the opening areas 400. The black matrix 210 has a width that is greater than a distance between two adjacent ones of the light blocking frames 110. In such a liquid crystal panel, although the width of the black matrix is increased to have the actual width of the black matrix greater than the distance between two adjacent light shielding frames in order to prevent the problems of color mixing and color shifting and light leaking, but also leading to the aperture ratio of the liquid crystal panel being not ideal.

SUMMARY OF THE INVENTION

An object of the present invention is to provide a liquid crystal panel that prevents fault situations of light leaking and color shifting caused by positional deviation of a black matrix and provides a relatively high aperture ratio.

To achieve the above object, the present invention provides a liquid crystal panel, comprising a thin-film transistor (TFT) substrate, a color filter (CF) substrate opposite to the TFT substrate, and a liquid crystal layer arranged between the TFT substrate and the CF substrate;

wherein the TFT substrate comprises a first substrate, a black matrix arranged on the first substrate, a plurality of scan lines arranged to extend in a horizontal direction, a plurality of data lines arranged to extend in a vertical direction, a plurality of light blocking frames, a plurality of TFTs, and pixel electrodes;

the CF substrate comprises a second substrate, color resist layers arranged under the second substrate, and a common electrode arranged under the color resist layers; and in the TFT substrate, the plurality of scan lines and the plurality of data lines perpendicularly intersect each other to define a plurality of pixel zones, each of the pixel zones comprising, formed therein, an opening area, the light blocking frames being arranged under the pixel electrodes to correspond to peripheries of the opening areas, the black matrix comprising a plurality of black light shielding frames that is respectively set in the plurality of pixel zones in the horizontal direction and is arranged in the form of a matrix, the black light shielding frames being each set, in the horizontal direction, at a location corresponding gaps between the light blocking frame and the scan lines and the data lines.

The black matrix is formed on an upper surface of the first substrate.

The first substrate has an upper surface in which grooves are formed to each correspond to a gap between the light blocking frame and the scan lines and the data lines of each of the pixel zones, the black light shielding frames being filled in the grooves.

The black light shielding frames have an upper surface substantially flush with the upper surface of the first substrate.

The grooves are formed in the upper surface of the first substrate through etching The first substrate and the second substrate are both glass substrates.

The common electrode and the pixel electrode are each formed of a material of indium tin oxide (ITO) and the light shielding frames are formed of a metallic material.

The TFT substrate further comprises an insulation layer between the scan lines and the pixel electrodes.

The insulation layer is formed of a material of $SiN_x$.

The black light shielding frames have a width that is greater than a width of a gap between the light blocking frames and the scan lines and the data line.

The present invention also provides a liquid crystal panel, which comprises a TFT substrate, a CF substrate opposite to the TFT substrate, and a liquid crystal layer arranged between the TFT substrate and the CF substrate;

wherein the TFT substrate comprises a first substrate, a black matrix arranged on the first substrate, a plurality of scan lines arranged to extend in a horizontal direction, a plurality of data lines arranged to extend in a vertical direction, a plurality of light blocking frames, a plurality of TFTs, and pixel electrodes;

the CF substrate comprises a second substrate, color resist layers arranged under the second substrate, and a common electrode arranged under the color resist layers; and in the TFT substrate, the plurality of scan lines and the plurality of data lines perpendicularly intersect each other to define a plurality of pixel zones, each of the pixel zones comprising, formed therein, an opening area, the light blocking frames being arranged under the pixel electrodes to correspond to peripheries of the opening areas, the black matrix comprising a plurality of black light shielding frames that is respectively set in the plurality of pixel zones in the horizontal direction and is arranged in the form of a matrix, the black light shielding frames being each set, in the horizontal direction, at a location corresponding gaps between the light blocking frame and the scan lines and the data lines;

wherein the black matrix is formed on an upper surface of the first substrate;

wherein the common electrode and the pixel electrode are each formed of a material of ITO and the light shielding frames are formed of a metallic material;

wherein the TFT substrate further comprises an insulation layer between the scan lines and the pixel electrodes;

wherein the insulation layer is formed of a material of $SiN_x$; and wherein the black light shielding frames have a width that is greater than a width of a gap between the light blocking frames and the scan lines and the data line.

The efficacy of the present invention is that the present invention provides a liquid crystal panel, in which a black matrix is formed on a TFT substrate and the black matrix comprises a plurality of black light shielding frames respectively located in a plurality of pixel zones and arranged in the form of a matrix. The black light shielding frames are each set at a gap between a light blocking frame and data lines and scan lines along a periphery of an opening area of each of the pixel zones so that the liquid crystal panel of the present invention eliminates the occurrence of defect situations of light leaking and color shifting resulting from positional deviation of the black matrix caused by positional shift between upper and lower substrates and also provides a relatively high aperture ratio.

BRIEF DESCRIPTION OF THE DRAWINGS

The features and technical contents of the present invention will be apparent from the following detailed description of the present invention and the attached drawing; however, these drawings are provided for reference and illustration and are not intended to limit the scope of the present invention. In the drawing.

DETAILED DESCRIPTION OF THE PREFERRED EMBODIMENTS

Figure 1:
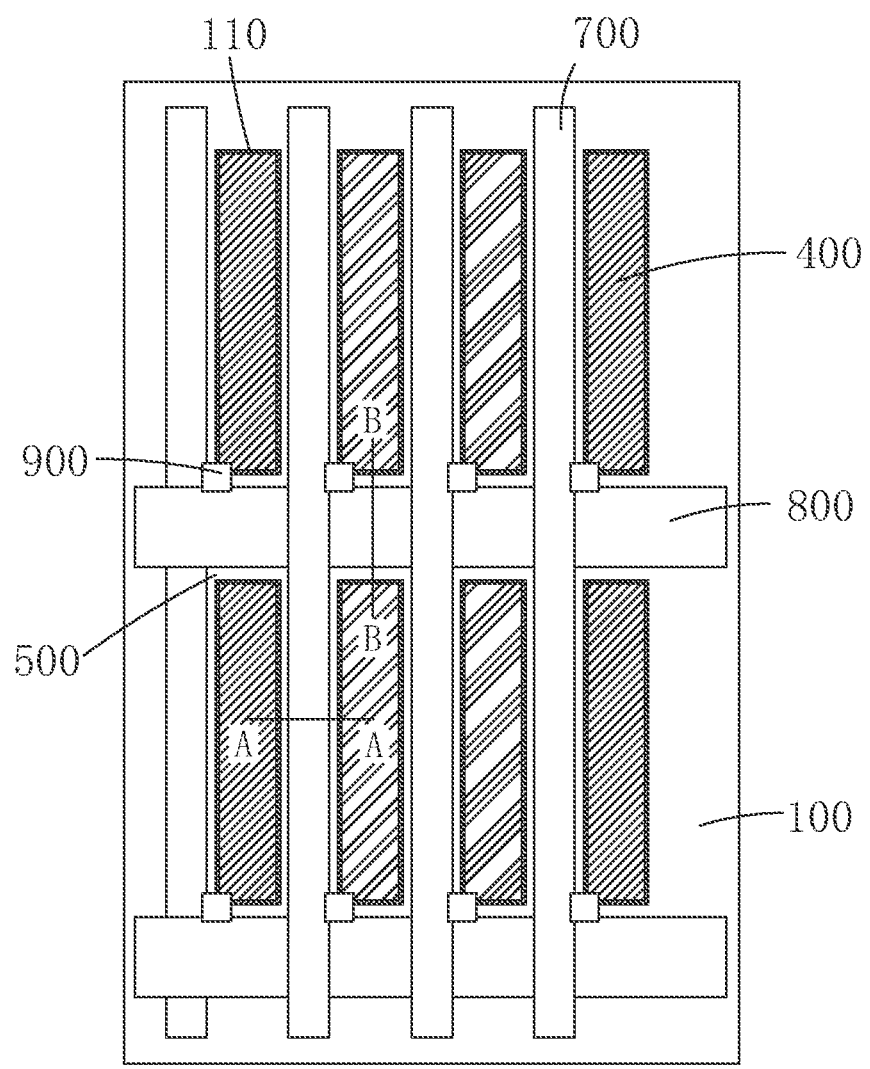
FIG. 1 is a top plan view showing a conventional thin-film transistor (TFT) substrate of a liquid crystal panel.
Figure 2:
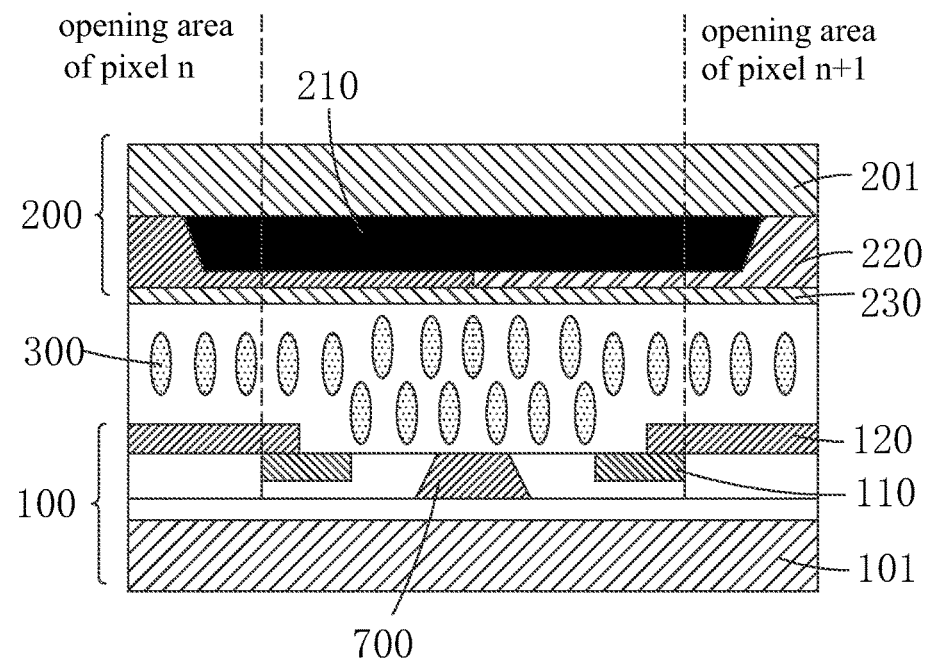
FIG. 2 is a cross-sectional view taken along line A-A of the liquid crystal panel of FIG. 1.
Figure 3:
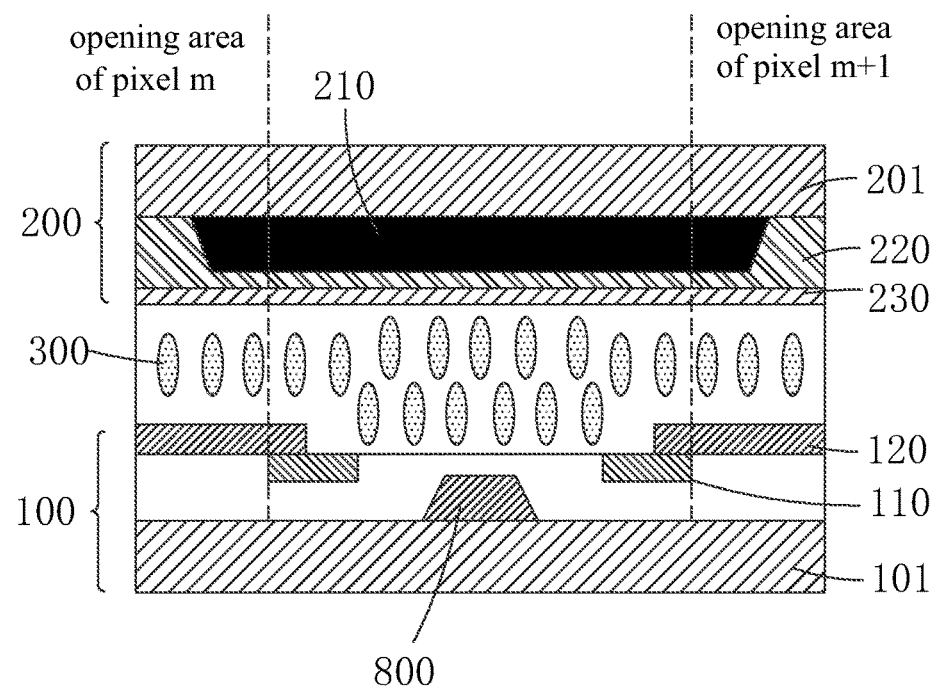
FIG. 3 is a cross-sectional view taken along line B-B of the liquid crystal panel of FIG. 1.
Figure 4:
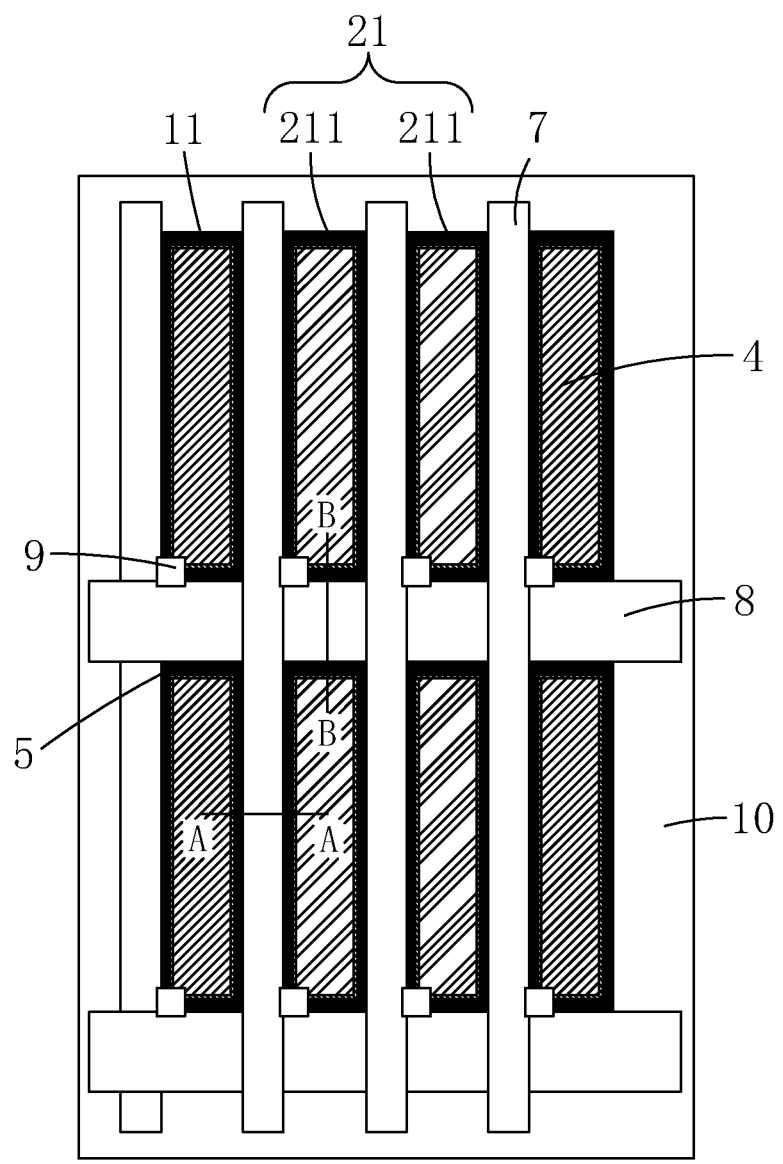
FIG. 4 is a top plan view showing a TFT substrate of a liquid crystal panel according to the present invention.

To further expound the technical solution adopted in the present invention and the advantages thereof, a detailed description is given to a preferred embodiment of the present invention and the attached drawings.

Referring to FIGS. 4-8, the present invention provides a liquid crystal panel, which comprises a thin-film transistor (TFT) substrate 1, a color filter (CF) substrate 2 opposite to the TFT substrate 1, and a liquid crystal layer 3 arranged between the TFT substrate 1 and the CF substrate 2.

Specifically, the TFT substrate 1 comprises a first substrate 10, a black matrix 21 arranged on the first substrate 10, a plurality of scan lines 8 arranged to extend in a horizontal direction, a plurality of data lines 7 arranged to extend in a vertical direction, a plurality of light blocking frames 11, a plurality of TFTs 9, and pixel electrodes 12.

Specifically, the CF substrate 2 comprises a second substrate 20, color resist layers 22 arranged under the second substrate 20, and a common electrode 23 arranged under the color resist layers 22.

In the TFT substrate 1, the plurality of scan lines 8 and the plurality of data lines 7 perpendicularly intersect each other to define a plurality of pixel zones 5. Each of the pixel zones 5 comprises, formed therein, an opening area 4. The light blocking frames 11 are arranged under the pixel electrodes 12 to correspond to peripheries of the opening areas 4. The black matrix 21 comprises a plurality of black light shielding frames 211 that is respectively set in the plurality of pixel zones 5 in the horizontal direction and is arranged in the form of a matrix. The black light shielding frames 211 are each set, in the horizontal direction, at a location corresponding gaps between the light blocking frame 11 and the scan lines 8 and the data lines 7.

Preferably, the black light shielding frames 211 have a width that is slightly greater than widths of the gaps between the light blocking frames 11 and the scan lines 8 and the data lines 7.

Specifically, the first substrate 10 and the second substrate 20 are both glass substrates.

Specifically, the common electrode 23 the pixel electrode 12 are formed of a material of indium tin oxide (ITO). Specifically, the light blocking frames 11 are formed of a metallic material.

Specifically, the TFT substrate further comprises an insulation layer (not shown) between the scan lines 8 and the pixel electrodes 12. Preferably, the insulation layer is formed of a material of silicon nitride ($SiN_x$).

Figure 5:
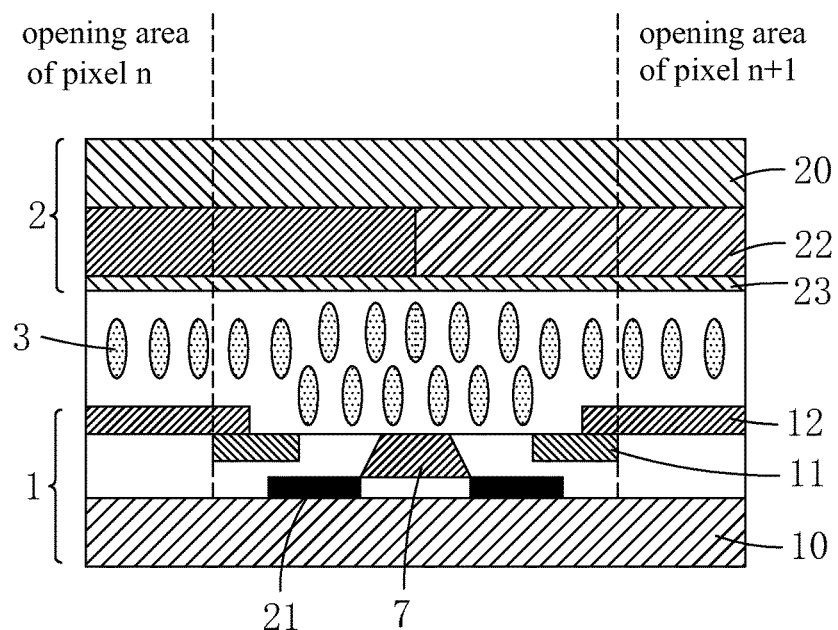
FIG. 5 is a cross-sectional view taken along line A-A of FIG. 4 illustrating a first embodiment of the liquid crystal panel of the present invention.
Figure 6:
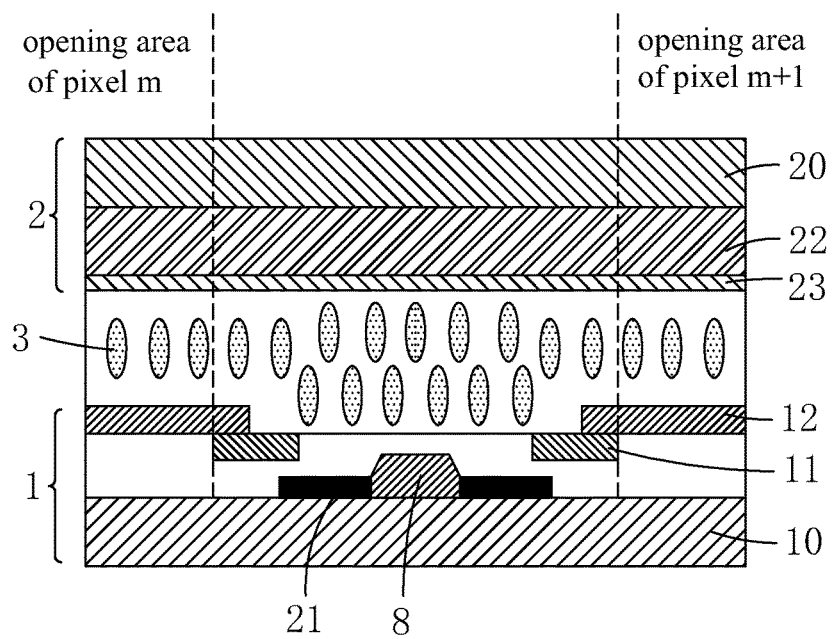
FIG. 6 is a cross-sectional view taken along line B-B of FIG. 4 illustrating the first embodiment of the liquid crystal panel of the present invention.

Referring to FIGS. 5-6, a first embodiment of the liquid crystal panel of the present invention is shown, wherein in manufacturing the TFT substrate 1, the black matrix 21 is formed, in a first process, on an upper surface of the first substrate 10 in such a way that each of the black light shielding frames 211 is located at a gap between the light blocking frame 11 and the data lines 7 and the scan lines 8 of each of the pixel zones 5 of the TFT substrate 1 so as to prevent defects of light leaking and color shifting resulting from positional deviation of the black matrix 21 caused by positional shifting between upper and lower substrates and also to provide a relatively high aperture ratio.

Figure 7:
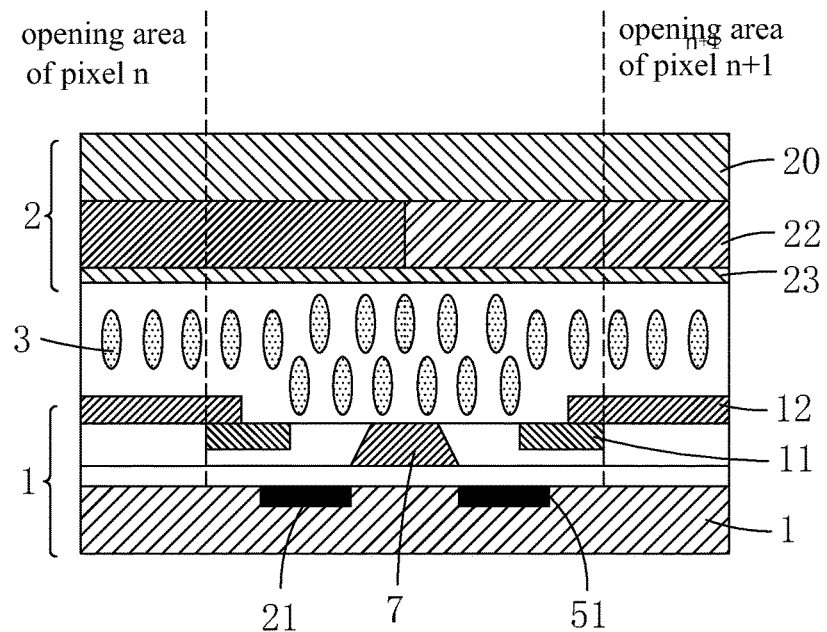
FIG. 7 is a cross-sectional view taken along line A-A of FIG. 4 illustrating a second embodiment of the liquid crystal panel of the present invention.
Figure 8:
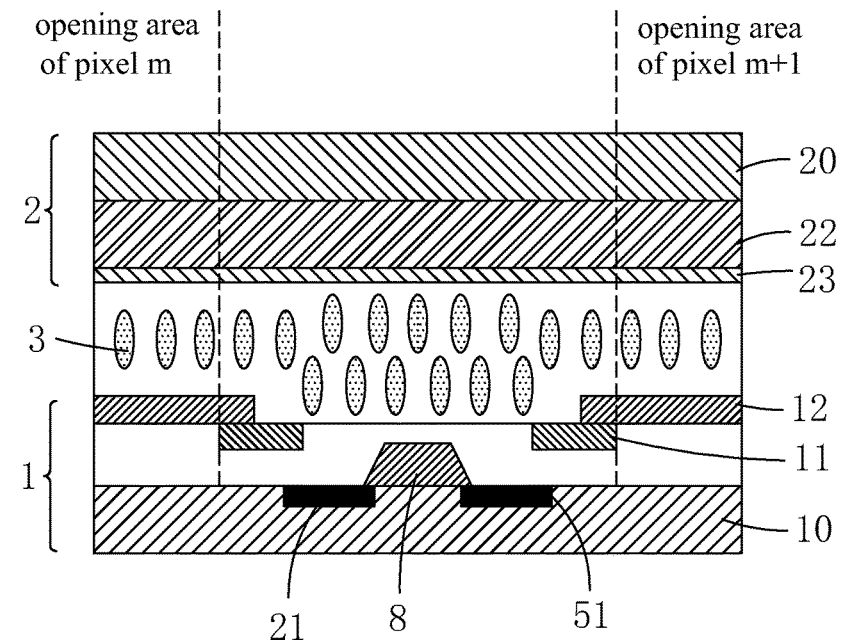
FIG. 8 is a cross-sectional view taken along line B-B of FIG. 4 illustrating the second embodiment of the liquid crystal panel of the present invention.

Referring to FIGS. 7-8, a second embodiment of the liquid crystal panel of the present invention is shown, which is different from the first embodiment in that the first substrate 10 is provided, in the upper surface thereof, grooves 51 corresponding to gaps between the light blocking frame 11 and the scan lines 8 and the data lines 7 of each of the pixel zones 5 and the black light shielding frames 211 are arranged to fill in the grooves 51. In manufacturing the second embodiment of the liquid crystal panel, the TFT substrate 1 is first etched to form a plurality of grooves 51, in such a way that the grooves 51 show a form of a frame and then, a material of the black matrix is filled therein to have an upper surface of the black light shielding frames 211 substantially flush with an upper surface of the first substrate 10. After the formation of the black matrix 21, the remaining film layers of the TFT substrate 1 are then manufactured. Compared to the first embodiment, an advantage is that when a desired depth of the black light shielding frames 211 is known, grooves 51 of a corresponding depth can be formed in the first substrate 10 through etching so that the upper surface of the black light shielding frames 211 is flush with an upper surface of the first substrate 10. This ensures the subsequent film formation operations are not affected by the previously formed film layers.

In summary, the present invention provides a liquid crystal panel, in which a black matrix is formed on a TFT substrate and the black matrix comprises a plurality of black light shielding frames respectively located in a plurality of pixel zones and arranged in the form of a matrix. The black light shielding frames are each set at a gap between a light blocking frame and data lines and scan lines along a periphery of an opening area of each of the pixel zones so that the liquid crystal panel of the present invention eliminates the occurrence of defect situations of light leaking and color shifting resulting from positional deviation of the black matrix caused by positional shift between upper and lower substrates and also provides a relatively high aperture ratio.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal panel, comprising a thin-film transistor (TFT) substrate, a color filter (CF) substrate opposite to the TFT substrate, and a liquid crystal layer arranged between the TFT substrate and the CF substrate,
    wherein the TFT substrate comprises a first substrate, a black matrix arranged on the first substrate, a plurality of scan lines arranged to extend in a horizontal direction, a plurality of data lines arranged to extend in a vertical direction, a plurality of light blocking frames, a plurality of TFTs, and pixel electrodes;
    the CF substrate comprises a second substrate, color resist layers arranged under the second substrate, and a common electrode arranged under the color resist layers; and
    in the TFT substrate, the plurality of scan lines and the plurality of data lines perpendicularly intersect each other to define a plurality of pixel zones, each of the pixel zones comprising, formed therein, an opening area, the light blocking frames being arranged under the pixel electrodes to correspond to peripheries of the opening areas, the black matrix comprising a plurality of black light shielding frames that is respectively set in the plurality of pixel zones in the horizontal direction and is arranged in the form of a matrix, the black light shielding frames being each set, in the horizontal direction, at a location corresponding gaps between the light blocking frames and the scan lines and the data lines;
    where the black light shielding frames of the black matrix are respectively arranged along two opposite side edges of each of the scan lines and the data lines and having portions located between the opposite side edges and the light blocking frames corresponding to and spaced from the opposite side edges, and wherein the portions of the black light shielding frames extend, in opposite sideways directions from the opposite side edges towards the corresponding light blocking frame such that the portions of the black light shielding frames have dimensions that greater than distances between the opposite side edges and the corresponding light blocking frames so that distal edges of the portions of the black light shielding frames extends in the opposite sideways directions beyond edges of the corresponding light blocking frames facing the opposite side edges.

2. The liquid crystal panel as claimed in claim 1, wherein the black matrix is formed on an upper surface of the first substrate.

3. The liquid crystal panel as claimed in claim 1, wherein the first substrate has an upper surface in which grooves are formed to each correspond to a gap between the light blocking frame and the scan lines and the data lines of each of the pixel zones, the black light shielding frames being filled in the grooves.

4. The liquid crystal panel as claimed in claim 3, wherein the black light shielding frames have an upper surface substantially flush with the upper surface of the first substrate.

5. The liquid crystal panel as claimed in claim 3, wherein the grooves are formed in the upper surface of the first substrate through etching.

6. The liquid crystal panel as claimed in claim 1, wherein the first substrate and the second substrate are both glass substrates.

7. The liquid crystal panel as claimed in claim 1, wherein the common electrode and the pixel electrode are each formed of a material of indium tin oxide (ITO) and the light shielding frames are formed of a metallic material.

8. The liquid crystal panel as claimed in claim 1, wherein the TFT substrate further comprises an insulation layer between the scan lines and the pixel electrodes.

9. The liquid crystal panel as claimed in claim 8, wherein the insulation layer is formed of a material of $SiN_x$.

10. The liquid crystal panel as claimed in claim 1, wherein the black light shielding frames have a width that is greater than a width of a gap between the light blocking frames and the scan lines and the data line.

11. A liquid crystal panel, comprising a thin-film transistor (TFT) substrate, a color filter (CF) substrate opposite to the TFT substrate, and a liquid crystal layer arranged between the TFT substrate and the CF substrate;
    wherein the TFT substrate comprises a first substrate, a black matrix arranged on the first substrate, a plurality of scan lines arranged to extend in a horizontal direction, a plurality of data lines arranged to extend in a vertical direction, a plurality of light blocking frames, a plurality of TFTs, and pixel electrodes;

the CF substrate comprises a second substrate, color resist layers arranged under the second substrate, and a common electrode arranged under the color resist layers; and in the TFT substrate, the plurality of scan lines and the plurality of data lines perpendicularly intersect each other to define a plurality of pixel zones, each of the pixel zones comprising, formed therein, an opening area, the light blocking frames being arranged under the pixel electrodes to correspond to peripheries of the opening areas, the black matrix comprising a plurality of black light shielding frames that is respectively set in the plurality of pixel zones in the horizontal direction and is arranged in the form of a matrix, the black light shielding frames being each set, in the horizontal direction, at a location corresponding gaps between the light blocking frames and the scan lines and the data lines;

where the black light shielding frames of the black matrix are respectively arranged along two opposite side edges of each of the scan lines and the data lines and having portions located between the opposite side edges and the light blocking frames corresponding to and spaced from the opposite side edges, and wherein the portions of the black light shielding frames extend, in opposite sideways directions from the opposite side edges towards the corresponding light blocking frame such that the portions of the black light shielding frames have dimensions that greater than distances between the opposite side edges and the corresponding light blocking frames so that distal edges of the portions of the black light shielding frames extends in the opposite sideways directions beyond edges of the corresponding light blocking frames facing the opposite side edges;

wherein the first substrate and the second substrate are both glass substrates;

wherein the common electrode and the pixel electrode are each formed of a material of indium tin oxide (ITO) and the light shielding frames are formed of a metallic material;

wherein the TFT substrate further comprises an insulation layer between the scan lines and the pixel electrodes;

wherein the insulation layer is formed of a material of $SiN_x$; and wherein the black light shielding frames have a width that is greater than a width of a gap between the light blocking frames and the scan lines and the data line.

12. The liquid crystal panel as claimed in claim 11, wherein the black matrix is formed on an upper surface of the first substrate.

13. The liquid crystal panel as claimed in claim 11, wherein the first substrate has an upper surface in which grooves are formed to each correspond to a gap between the light blocking frame and the scan lines and the data lines of each of the pixel zones, the black light shielding frames being filled in the grooves.

14. The liquid crystal panel as claimed in claim 13, wherein the black light shielding frames have an upper surface substantially flush with the upper surface of the first substrate.

15. The liquid crystal panel as claimed in claim 13, wherein the grooves are formed in the upper surface of the first substrate through etching.

* * * * *